United States Patent
Sasaki et al.

[11] Patent Number: 6,008,151
[45] Date of Patent: Dec. 28, 1999

[54] NON-MAGNETIC CERAMICS AND CERAMIC MULTILAYER PARTS

[75] Inventors: Masami Sasaki; Hiroshige Okawa; Yasuyoshi Suzuki, all of Chiba; Hideki Masuda, Akita; Hisayuki Abe, Akita; Akira Suda, Akita, all of Japan

[73] Assignee: TDK Corporation, Tokyo, Japan

[21] Appl. No.: 09/089,502

[22] Filed: Jun. 3, 1998

[30] Foreign Application Priority Data

Jun. 3, 1997 [JP] Japan ................................ 9-160456

[51] Int. Cl.⁶ ........................................... C03C 14/00
[52] U.S. Cl. ........................ 501/17; 501/32; 501/49; 501/52
[58] Field of Search ............................. 501/17, 32, 49, 501/52

[56] References Cited

U.S. PATENT DOCUMENTS 5,079,194  1/1992  Jean et al. .

FOREIGN PATENT DOCUMENTS 4-243963   9/1992  Japan .
10-189828  7/1998  Japan .

Primary Examiner—Paul Marcantoni
Attorney, Agent, or Firm—Oblon, Spivak, McClelland, Maier & Neustadt, P.C.

[57] ABSTRACT

The invention provides a nonmagnetic ceramic comprising 5% to 40% by weight of α-quartz and 5% to 60% by weigth of zinc silicate dispersed in 35% to 75% by weight of borosilicate glass as a matrix, the borosilicate glass having $SiO_2$ and $B_2O_3$ contents: $SiO_2$=70 to 90% by weight and $B_2O_3$=10 to 30% by weight. Using the nonmagnetic ceramic, multilayer ceramic inductors are obtained. When the ceramic is used as ceramic multilayer parts having an inductor section, it has a low dielectric constant and good characteristics in the high-frequency region, allows for low-temperature firing enabling the use of silver electrodes, prevents chip deformation and crack occurrence upon sintering, and provides a higher mechanical strength.

5 Claims, 7 Drawing Sheets

NON-MAGNETIC CERAMICS AND CERAMIC MULTILAYER PARTS

BACKGROUND OF THE INVENTION

1. Field of the Invention

This invention relates to nonmagnetic ceramics and ceramic multilayer parts having inductor sections formed using the nonmagnetic ceramics.

2. Background Art

Ceramic multilayer parts such as chip filters and chip inductors are widely employed with the advance of the technology of fabricating electronic parts as surface mount devices (SMD) and to meet the demand for higher performance on high-frequency parts as used in communication equipment. Inductor sections of chip filters and chip inductors are manufactured, without using windings, by depositing alternating layers of magnetic paste and conductive paste and firing the layers for integration.

For the ceramic magnetic layers in the inductor sections of ceramic multilayer parts, Ni—Cu—Zn ferrites and analogous materials are generally selected because they can be fired at low temperatures and have relatively superior high-frequency characteristics. Also, silver or silver alloy having a low resistivity is used as the conductive material for the internal conductor.

However, since Ni—Cu—Zn ferrites have a dielectric constant E of about 10 to about 15, it is difficult to reduce the floating capacitance between internal conductor patterns when the spacing between the conductor patterns is narrow. For this reason, in the event of narrow internal conductor patterns, the self-resonant frequency cannot be high and the use at high frequency is restricted.

Under such circumstances, JP-A 7809/1992 proposes "a multilayer ceramic inductor comprising a conductor pattern turned between insulator layers, with edges interconnected, in an overlapping manner in a stacking direction, characterized in that the material of which said insulator layers are formed is a nonmagnetic ceramic material." It is described that exemplary of the nonmagnetic ceramic material used therein are "mixtures of glass and cordierite" and "mixtures of glass and cordierite with mullite added," and as the glass, borosilicate glass containing 63 to 85% by weight of $SiO_2$ and 3 to 28% by weight of $B_2O_3$ is preferred. Allegedly, the use of such nonmagnetic ceramic materials in the insulator layers allows the insulator layers to reduce their dielectric constant and increase their self-resonant frequency so as to comply with the high-frequency band, and also allows for low-temperature firing which in turn, enables the use of silver electrodes.

However, where the nonmagnetic ceramic materials described in the above-referred publication are used, multilayer ceramic inductors cannot have a fully high flexural strength. As a result, the deflective strength required for surface mount parts would become insufficient. The dielectric constant is about one-half of that of ferrite-containing materials, that is, $\epsilon$=about 5.5 to about 6.5, which values are not sufficient for use in parts incorporated in high-frequency circuits as in cellular phones.

Also, using a composition of borosilicate glass and fused $SiO_2$, the inventor previously accomplished a dielectric constant $\epsilon$ of 4.2. This composition, however, had the following problems. In compositions comprising borosilicate glass and $SiO_2$ glass serving as nonmagnetic ceramic materials, when $SiO_2$ glass is added in an amount of 25% by weight or more, the growth of cristobalite crystals occurs upon sintering. At this point, crystals having a high crystallinity localize or concentrate about silver serving as the conductor. The change of coefficient of thermal expansion caused by the cristobalite crystal growth becomes outstanding when the temperature rises from 100° C. to 300° C., and the coefficient increases from 0% to 0.260% or 0.270%. As a result, the rapid expansion by the cristobalite crystal growth localized about the conductor generates internal stresses, and even causes chip deformation or crack generation near the conductor particularly when inductors having an increased number of turns are fabricated.

SUMMARY OF THE INVENTION

An object of the present invention is to provide a nonmagnetic ceramic which when used as ceramic multilayer parts having inductor sections, has a low dielectric constant and good characteristics in the high-frequency region, allows for low-temperature firing enabling the use of silver electrodes, prevents chip deformation and crack occurrence upon sintering, and provides a higher mechanical strength, as well as a ceramic multilayer part.

This and other objects are achieved by any one of the constructions defined below as (1) to (7).

(1) A nonmagnetic ceramic comprising 35% to 75% by weight of borosilicate glass as a matrix and 5% to 40% by weight of α-quartz and 5% to 60% by weight of zinc silicate dispersed therein, said borosilicate glass having contents of $SiO_2$ and $B_2O_3$:
$SiO_2$=70 to 90% by weight and
$B_2O_3$=10 to 30% by weight.

(2) The nonmagnetic ceramic of (1) which has been prepared by mixing the borosilicate glass with α-quartz and zinc silicate, followed by firing.

(3) The nonmagnetic ceramic of (1) wherein said borosilicate glass contains as an auxiliary component at least one member selected from the group consisting of $K_2O$, $Na_2O$, BaO, SrO, $Al_2O_3$, and CaO in a total amount of up to 5% by weight.

(4) The nonmagnetic ceramic of (1) wherein said α-quartz has a mean particle size of 0.1 to 5.0 μm.

(5) The nonmagnetic ceramic of (1) having a dielectric constant of 4.0 to 5.4.

(6) A ceramic multilayer part comprising an inductor section using the nonmagnetic ceramic of (1).

(7) The ceramic multilayer part of (6) wherein silver or a silver base alloy is used as an internal conductor.

FUNCTION AND BENEFITS

Figure 1:
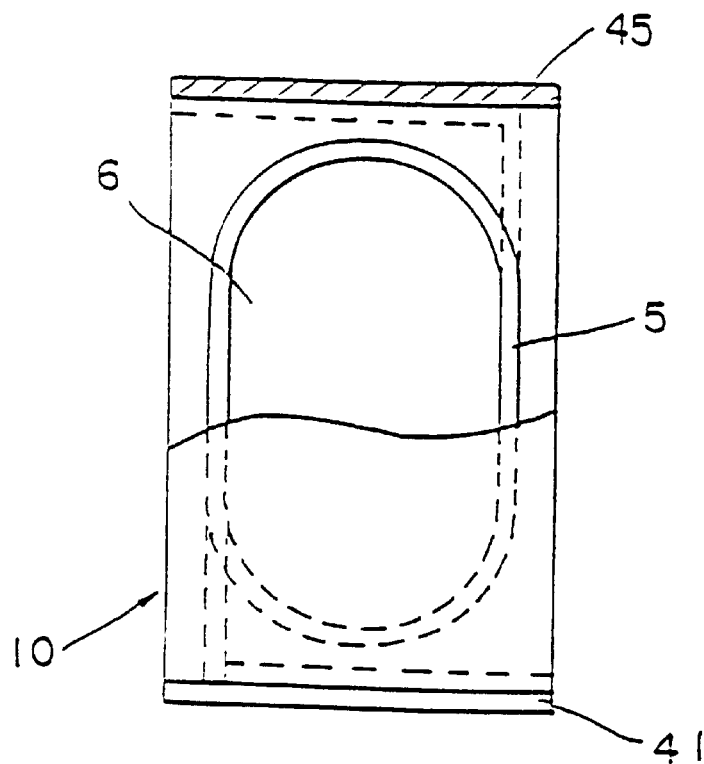
FIG. 1 is a partially cut-away plan view of one exemplary construction of a multilayer ceramic inductor.

In the inductor section of the ceramic multilayer part according to the invention, nonmagnetic ceramic layers comprising borosilicate glass as a matrix, α-quartz, and zinc silicate as a filler are used instead of the prior art ferrite magnetic layers. Because of their markedly low dielectric constant compared with the ferrite magnetic layers, the nonmagnetic ceramic layers can be outstandingly increased in self-resonant frequency. This facilitates the adaptation to the high-frequency band and increases the degree of freedom in the structural design of ceramic multilayer parts. Additionally, since the temperature at which the nonmagnetic ceramic layers can be sintered to a high density is low, silver having favorable properties despite the low melting point can be used as the internal conductor.

Also, the addition of α-quartz and zinc silicate as a filler according to the invention results in a high flexural strength and a deflective strength sufficient as surface mount parts.

Furthermore, the growth of cristobalite crystals during sintering is suppressed so that the chip deformation and crack generation caused by internal stresses are avoided even when inductors having an increased number of turns are fabricated.

It is noted that JP-A 265858/1988 discloses a ceramic comprising zinc silicate and borosilicate glass containing 2.5 to 30 mol % of $B_2O_3$ and 2.5 to 50 mol % of $SiO_2$. It is difficult to tailor the composition so as to have a sintering temperature of lower than 960° C. This prohibits silver (of approximately 100%) from being used as the internal conductor. A dielectric constant of up to 6 is insufficient. No satisfactory frequency response is obtained. The flexural strength is low.

DESCRIPTION OF THE PREFERRED EMBODIMENTS

Now the illustrative construction of the invention is described in detail.

Nonmagnetic Ceramic

The nonmagnetic ceramic of the invention is typically applied to the fabrication of various ceramic multilayer parts having inductor sections.

The nonmagnetic ceramic of the invention is a composition wherein borosilicate glass as a matrix is mixed with α-quartz and zinc silicate as a filler. It is obtained by mixing the components in such compositional proportions that borosilicate glass is 35 to 75% by weight, especially 60 to 70% by weight, α-quartz is 5 to 40% by weight, especially 10 to 35% by weight, and zinc silicate is 5 to 60% by weight, especially 5 to 30% by weight, followed by sintering.

The nonmagnetic ceramic obtained in accordance with the mixing composition within the above-described range has a significantly low dielectric constant as compared with ferrites. When inductors in the form of ceramic multilayer parts are formed using this nonmagnetic ceramic, there can be provided ceramic multilayer parts having superior high-frequency characteristics. In this regard, insulation resistance, flexural strength, sinterability, and printability are fully satisfactory. If the content of borosilicate glass is more than 75% by weight or less than 35% by weight, some of these characteristics lower below the critical level. More particularly, if the content of borosilicate glass is more than 75% by weight, the flexural strength lowers so that chips can be deformed upon sintering. If the content of borosilicate glass is less than 35% by weight, the firing temperature becomes higher, the flexural strength lowers, and the sinterability lowers. Insofar as the composition falls within the above-defined range, the dielectric constant at room temperature is satisfactory as evidenced by $\epsilon$=4.0 to 5.4, more preferably 4.1 to 5.0, and especially 4.1 to 4.5. Also, the flexural strength can have fully satisfactory values.

The composition of borosilicate glass used as the matrix according to the invention is such that the content of $SiO_2$ is 70 to 90% by weight, preferably 75 to 85% by weight and the content of $B_2O_3$ is 10 to 30% by weight, preferably 15 to 25% by weight. With this composition range set, the borosilicate glass has a low softening point as will be described later, which enables co-firing with silver base electrodes. Further with this composition range set, a satisfactory dielectric constant and flexural strength are available.

Besides, at least one member selected from $K_2O$, $Na_2O$, BaO, SrO, CaO, etc. may be contained in a total amount of up to about 5% by weight. In particular, BaO, SrO and CaO are effective for suppressing $B_2O_3$ from precipitating on the green chip surface, and $K_2O$ and $Na_2O$ are effective for sintering. These oxides may deviate more or less from the above-identified stoichiometry. Where two or more oxides are added, the mixing ratio is arbitrary.

If the proportion of borosilicate glass in the main component is too low, the nonmagnetic ceramic has a higher firing temperature which prevents the ceramic from being sintered to a high density when it is fired simultaneous with silver base electrodes. On the other hand, if the proportion of borosilicate glass is too high, the ceramic can be over-sintered, resulting in a deformed sintered body. The borosilicate glass preferably has a softening point of 750 to 870° C., more preferably 800 to 850° C. A too low softening point allows over-sintering, resulting in a deformed sintered body. A too high softening point causes short-sintering and prohibits dense sintering. No particular limit is imposed on the mean particle size of the borosilicate glass as a raw material although borosilicate glass with a mean particle size of 0.5 to 5.0 μm is preferably used.

Alpha-quartz is used as an additive to the above-described main component. The α-quartz may contain $Al_2O_3$, CaO, $Fe_2O_3$, etc. as impurities in a total amount of less than about 100 ppm. The α-quartz is added for the main purpose of improving flexural strength. If the proportion of α-quartz relative to borosilicate glass and zinc silicate is too high, sinterability is exacerbated, failing to achieve a sufficient flexural strength. Also if α-quartz is added to compositions containing more than 75% by weight of borosilicate glass and less than 5% by weight of zinc silicate, the resulting chip would have a low flexural strength and can be deformed. No particular limit is imposed on the particle size of α-quartz although the preferred particle size is about 0.1 to 5.0 μm, especially about 0.5 to 3.0 μm. The particle size of raw material is substantially equal to the particle size of α-quart as fired.

According to the invention, zinc silicate is used as a filler. Zinc silicate has the composition: $Zn_2SiO_4$, but may deviate more or less from this composition. Further, the zinc silicate may contain up to 10% by weight of $Al_2O_3$ or the like and up to about 100 ppm in total of impurities such as CaO, $ZrO_2$, MgO and BaO.

The filler is added mainly for improving flexural strength. If the proportion of the filler in the main component is too low, the flexural strength becomes insufficient, leading to chip deformation. Inversely, if the proportion of the filler is too high, the composition becomes less sinterable, failing to achieve a sufficient flexural strength. Also if the filler is added to compositions containing more than 75% by weight of borosilicate glass and less than 5% by weight of α-quartz, the resulting chip would have a low flexural strength and can be deformed. No particular limit is imposed on the mean particle size of the filler in the ceramic although in most cases, the preferred particle size is about 0.5 to 10 μm, more preferably about 0.5 to 5 μm. As previously described, the filler raw material and borosilicate glass may have anequivalent mean particle size. At the end of sintering, the borosilicate glass forms a matrix surrounding α-quartz and the filler.

Organic Vehicle

A paste is prepared by mixing borosilicate glass as the matrix material, zinc silicate as the filler, and α-quartz in the above-described mixing composition, with an organic vehicle. The organic vehicle is a solution of a binder in an organic solvent. The binder used in the organic vehicle is not critical and may be properly selected from various commonly used binders such as ethyl cellulose. The organic solvent is not critical too and may be properly selected from various well-known organic solvents in accordance with a particular application technique such as printing or sheeting technique. When the printing technique is used, for example, at least one of organic solvents having a relatively high boiling point such as Butyl Carbitol and terpineol is preferably used in order to suppress rapid volatilization. Also, when the sheeting technique is used, at least one of organic solvents having a relatively low boiling point such as ethanol, methanol, toluene, propanol, butanol, acetone, methyl ethyl ketone (MEK) and methyl isobutyl ketone (MIBK) is preferably used in order to promote volatilization. In either case, a mixture of solvents may be used.

The proportions of the binder and the solvent to the nonmagnetic ceramic composition, that is, borosilicate glass as the matrix material, zinc silicate as the filler, and α-quartz are not critical, with ordinary proportions being acceptable, for example, about 5 to 15 parts by weight of the binder and about 100 to 200 parts by weight of the solvent per 100 parts by weight of the nonmagnetic ceramic composition. Further, in the paste, various additives such as dispersants and plasticizers may be contained if necessary. The total content of these additives in the pate is preferably up to 10% by weight.

Firing

The nonmagnetic ceramic composition used in the practice of the invention has a firing temperature of, preferably 820 to 920° C., more preferably 850 to 890° C. The nonmagnetic ceramic composition of the invention can be fired at such a relatively low temperature. Understandably, at too low firing temperatures, it is difficult to obtain a dense sintered body. The firing time is preferably from 0.05 to 5 hours, and more preferably from 0.1 to 3 hours. The firing atmosphere varies with a particular construction of the internal conductor to be co-fired although firing is often carried out in air when silver base materials are used as the internal conductor.

Ceramic Multilayer Part

The ceramic multilayer part of the invention has at least an inductor section comprising alternately stacked nonmagnetic ceramic layers and internal conductor layers. The nonmagnetic ceramic layers are comprised of the above-described nonmagnetic ceramic composition. Such ceramic multilayer parts are exemplified by a multilayer ceramic inductor as shown in FIG. 1 and an LC composite part as shown in FIG. 2.

Multilayer Ceramic Inductor

Figure 2:
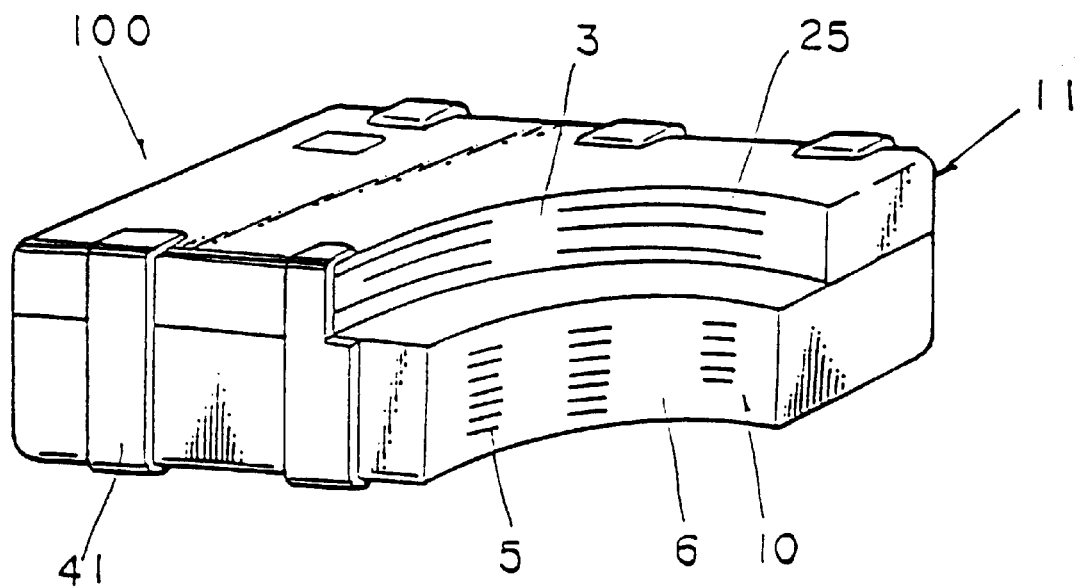
FIG. 2 is a partially cut-away perspective view of one exemplary construction of a LC composite part.

The multilayer ceramic inductor shown in FIG. 1 includes an inductor chip body 10 comprising alternately stacked nonmagnetic ceramic layers 6 and internal conductor layers 5, and external electrodes 41 and 45 formed on surfaces of the inductor chip body 10.

The constructions of respective sections of the multilayer ceramic inductor may be selected from the construction of JP-A 35982/1997 and prior art well-known constructions. For example, the outer shape is approximately rectangular parallelepiped. In most cases, as shown in FIG. 1, the internal conductor 5 is spirally extended within the nonmagnetic ceramic layers 6 to construct an internal winding while opposite ends of the internal conductor 5 are connected to the external electrodes 41 and 45. The winding pattern of the internal conductor 5 is not particularly limited, and the number of turns may be properly selected in accordance with an intended application. The number of turns which can be set herein is usually 1.5 to 15.5 turns. The dimensions of respective sections of the multilayer ceramic inductor are not critical and may be properly determined in accordance with an intended application. The nonmagnetic ceramic layers are about 20 to 100 μm thick. The external electrodes are usually about 10 to 100 μm thick, while the total thickness thereof combined with a plating layer of Cu, Ni or Sn is about 15 to 130 μm. The width of the external electrodes is selected in accordance with an intended application although it is usually at least 0.2 mm, preferably about 0.2 to 0.4 mm. The thickness of the internal conductor 5 is usually about 5 to 30 μm, and the thickness of one turn (electrode plus layer) is usually about 40 to 100 μm. The dimensions of the inductor chip body 10 are not critical and appropriate dimensions may be selected in accordance with an intended application. Typical dimensions are approximately 1.0 to 4.5 mm by 0.5 to 3.2 mm by 0.6 to 2.0 mm. Herein, the nonmagnetic ceramic layers 6 are formed of the above-described nonmagnetic ceramic.

The conductive material contained in the internal conductor 5 is preferably one based on silver having a low resistivity. Preferred silver base conductive materials are silver and silver alloys such as Ag—Pd, Ag—Pt and Ag—Pd—Pt, with silver (about 100% by weight) being especially preferred. The silver alloys should preferably have a silver content of at least 75% by weight. An internal conductor paste is prepared by kneading with an organic vehicle as mentioned above a conductive material comprising a conductive metal or alloy as mentioned above or any of oxides, organometallic compounds and resinates which convert into the conductive material after firing.

Figure 3:
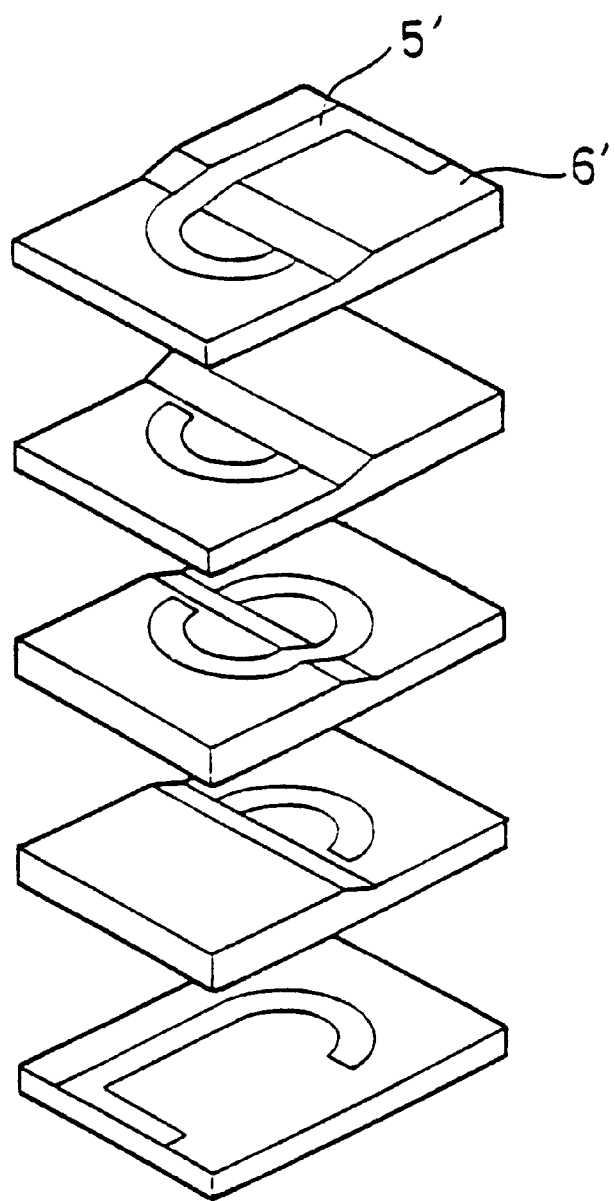
FIG. 3 is a schematic view illustrating the steps of fabricating a multilayer ceramic inductor.

For the external electrodes 41 and 45, silver base conductive materials are preferably used. Preferred silver base conductive materials are silver and silver alloys, with silver being especially preferred. Preferred silver alloys are Ag—Pd and Ag—Cu alloys, of which the Ag—Pd alloys are especially preferred. The silver alloys should preferably have a silver content of at least 75% by weight. The external electrodes may contain various glasses such as lead borosilicate glass. The external electrodes 41, 45 each may be a single electrode layer although a coating layer formed of Cu, Ni, Sn or solder is preferably formed thereon. Such a coating layer serves to improve the solder wettability and solder temperature resistance upon soldering. An external electrode paste may be prepared in the same manner as the internal conductor paste. Understandably, the external electrodes 41, 45, when formed, cooperate with the coating layers to prevent a plating solution from penetrating to the internal conductor 5 upon plating and hence, prevent the internal conductor 5 from being eroded.

Where the multilayer ceramic inductor is fabricated by the printing technique, as shown in FIG. 3, first a nonmagnetic ceramic composition paste 6' and an internal conductor paste 5' are alternately printed on a substrate having a PET film attached thereto so that the internal conductor paste 5' may define a coil pattern, forming a multilayer structure. Alternatively, the formation method of JP-A 35982/1997 may be used.

In this method, when a structure having conductor layers which are contiguous between a low step surface and a high step surface is established by forming a conductor layer that fills up the gap between the low step surface and the high step surface, and forming on the high step surface a conductor layer that is contiguous to the conductor layer filling up the gap. With this structure, there is obtained an electronic part which is highly reliable in that the film thickness is not reduced at the gap when the conductor layers which are contiguous between the low step surface and the high step surface are formed. Since the film thickness is not reduced at the gap, there is obtained an electronic part which is highly reliable in that no breakage of the conductor occurs. Further, since the film thickness is not reduced at the gap, any increase of electrical resistance at the step and any drop thereby of Q of the inductor are never induced.

Figure 4:
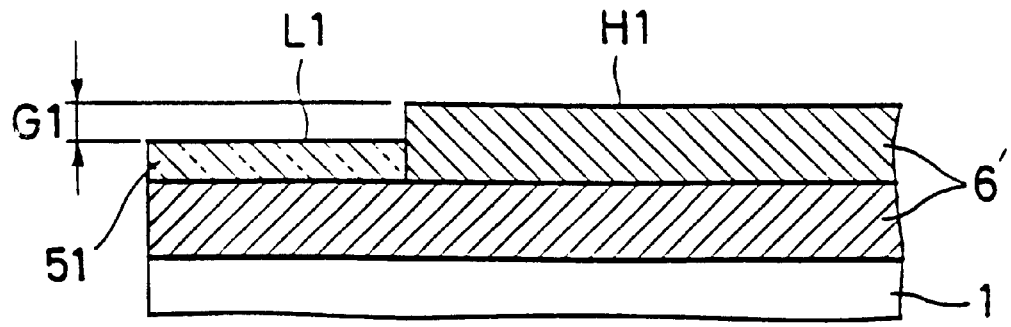
FIG. 4 illustrates one step of a process of fabricating an electronic part.
Figure 5:
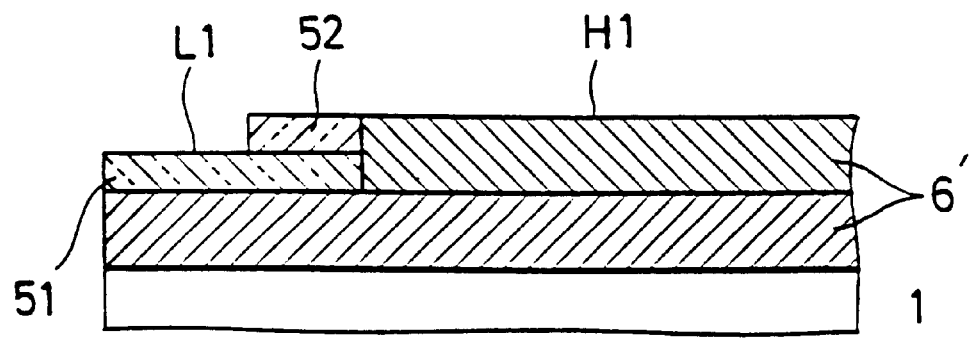
FIG. 5 illustrates a step subsequent to the step of FIG. 4.
Figure 6:
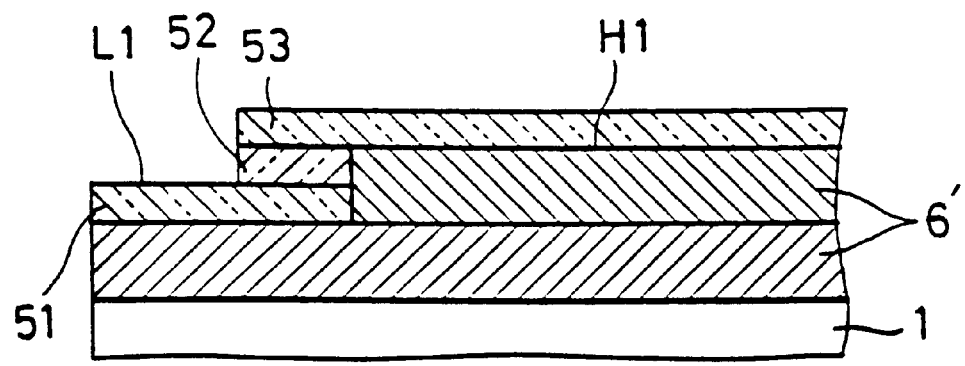
FIG. 6 illustrates a step subsequent to the step of FIG. 5.

Described below is a method of fabricating an inductor of this structure. FIGS. 4 to 6 illustrate steps of the method of fabricating a multilayer electronic part. In FIG. 4, a low step surface L1 is defined by the surface of an internal conductor paste 51, and a high step surface H1 is defined by the surface of a nonmagnetic ceramic composition paste 6'. The internal conductor paste 51 and the nonmagnetic ceramic composition paste 6' are formed on the surface of a nonmagnetic ceramic composition paste 6' formed on a support 1. Next, as shown in FIG. 5, in the gap G1 defined between the lower step surface L1 and the high step surface H1, an internal conductor paste 52 is formed so as to fill up the gap G1. The thickness of the internal conductor paste 52 need not necessarily be equal to the gap G1. Even if the internal conductor paste 52 is slightly lower than the gap G1, it functions to eliminate the inconvenience caused by the gap G1. The internal conductor paste 52 may be formed by a single coating step or a plurality of repetitive coating steps. Next, as shown in FIG. 6, in a second step, another internal conductor paste 53 is formed on the surface of internal conductor paste 52 and the high step surface H1. In the above-described construction, the internal conductor paste 52 is formed so as to fill up the gap defined between the low step surface L1 and the high step surface H1 and then, the other internal conductor paste 53 is formed on the surface of internal conductor paste 52 and the high step surface H1. Consequently, when conductor layers which are contiguous between the low step surface L1 and the high step surface H1 are formed, the thickness of conductor layers is maintained constant even at the area of gap G1. For this reason, there is obtained an electronic part which is highly reliable in that the film thickness is not reduced at the area of gap G1. Further, since the thicknesses of conductor layers are maintained constant at the area of gap G1, there is obtained an electronic part which is highly reliable in that no breakage of the conductor occurs at the area of gap G1. Moreover, since the thicknesses of conductor layers are maintained constant at the area of gap G1, any increase of electrical resistance at the area of gap G1 and any drop thereby of Q of the inductor are never induced.

Next, the structure is cut into green chips of the desired shape and size, which are separated from the substrate. On the other hand, in the case of fabrication by the sheeting technique, green sheets are first formed using the nonmagnetic ceramic composition paste, and the green sheets are perforated to form through-holes for interconnection. Next, an internal conductor paste is printed onto the green sheets, which are stacked. The thus obtained stack is cut into green chips. Next, each green chip is fired at a temperature in the above-described range of 820 to 920° C., obtaining an inductor chip body. After firing, an external electrode paste is printed or transferred to the inductor chip body and fired, yielding a multilayer ceramic inductor. The firing conditions for the external conductor paste are preferably 600 to 800° C. and about 10 minutes to 1 hour, for example. The multilayer ceramic inductor fabricated in this way is then mounted on a printed circuit board as by soldering for use in various electronic equipment.

LC Composite Part

The LC composite part 100 shown in FIG. 2 includes an inductor chip body 10 and a capacitor chip body 11 which are stacked and integrated. The inductor chip body 10 may be of the same construction as the inductor chip body 10 of the above-described multilayer ceramic inductor. External electrodes 41 formed on the surfaces of inductor chip body 10 and capacitor chip body 11 may be of the same construction as the external electrodes 41, 45 of the above-described multilayer ceramic inductor. An internal conductor 5 may be of the same construction as the above-described internal conductor 5 shown in FIG. 1.

The capacitor chip body 11 may be of the same construction as chip bodies of conventional multilayer ceramic capacitors. In the illustrated embodiment, it includes alternately stacked ceramic dielectric layers 3 and internal electrode layers 25. Various dielectric materials may be used in the ceramic dielectric layers 3. Of these, titanium oxide base dielectric materials are preferred because they can be fired at low temperatures, although titanate base composite oxides, zirconate base composite oxides or mixtures thereof may also be used. It is noted that glass such as borosilicate glass may be contained in the ceramic dielectric layers for lowering the firing temperature. More illustrative examples include TiO and analogues optionally containing NiO, CuO, $Mn_3O_4$, $Al_2O_2$, MgO, $SiO_2$ or the like as the titanium oxide base materials, $BaTiO_3$, $SrTiO_3$, $CaTiO_3$, $MgTiO_3$ and mixtures thereof as the titanate base composite oxides, and $BaZrO_3$, $SrZrO_3$, $CaZrO_3$, $MgZrO_3$ and mixtures thereof as the zirconate base composite oxides. The number of stacked dielectric layers may be determined in accordance with an intended application although it is usually 1 to about 100. The thickness of one layer is generally about 5 to 50 μm.

Figure 8:
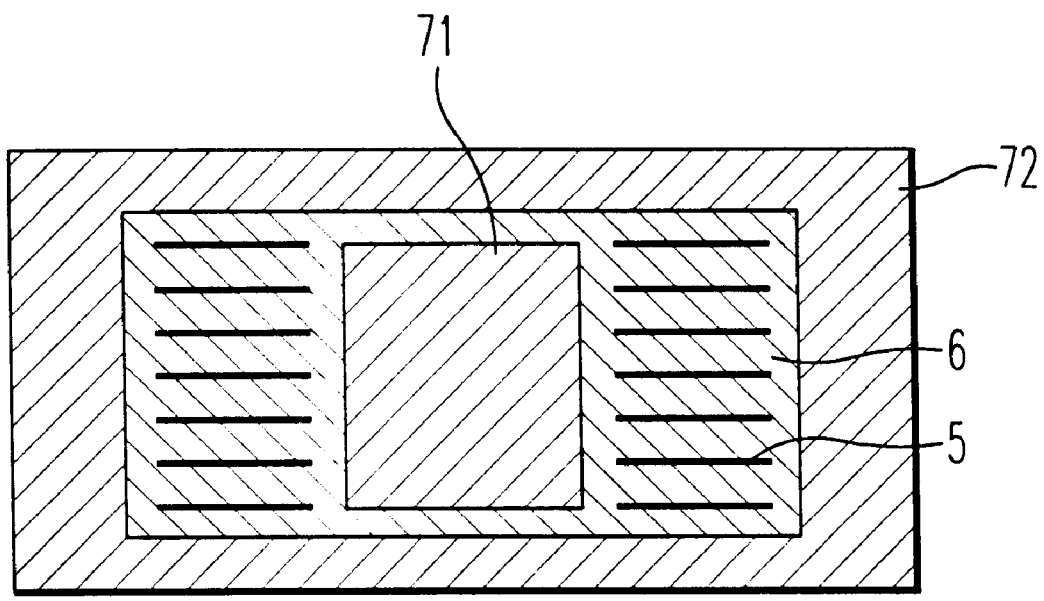
FIG. 8 is a cross-sectional view of one exemplary construction of a shielded multilayer ceramic inductor.

The invention is applicable not only to the above-described multilayer ceramic inductors and LC composite parts, but also to shielded multilayer ceramic inductors as disclosed in JP-B 58164/1991, for example. FIG. 8 illustrates one exemplary construction of a shielded multilayer ceramic inductor. This shielded multilayer ceramic inductor includes an internal magnetic body 71 having stacked internal magnetic material layers, a coil section having alternately stacked nonmagnetic ceramic layers 6 and internal conductor 5, and an external magnetic body 72 having stacked external magnetic material layers, wherein the internal magnetic body is enclosed within the coil section which is, in turn, enclosed within the external magnetic body. The internal conductor 5 extends from between the nonmagnetic ceramic layers 6 to between the nonmagnetic ceramic layers 6 and turns around the internal magnetic body so as to draw a spiral in a vertical direction. Ends of the internal conductor are taken out to the surface of the external magnetic body and connected to external electrodes (not shown). The nonmagnetic ceramic layers 6 are comprised of the nonmagnetic ceramic composition of the invention.

Additionally, the invention is applicable to multilayer hybrid integrated circuit devices having inductor sections. The multilayer hybrid integrated circuit devices are, for example, multilayer ceramic inductors or LC composite parts having resistors, capacitors, IC or the like mounted thereon. Besides, the invention is applicable to ceramic multilayer parts of any other construction insofar as they have nonmagnetic ceramic layers.

EXAMPLE

Examples of the invention are given below by way of illustration.

Example 1

A nonmagnetic ceramic composition paste was prepared by kneading a nonmagnetic ceramic composition consisting of the powders shown in Table 1 with an organic vehicle in an attritor for 3 hours. The borosilicate glass used contained:
  $SiO_2$: 80 wt %,
  $B_2O_3$: 18 wt %, and
  $K_2O$: 2 wt %.
The mean particle sizes of the respective powders are:
  borosilicate glass: 1.2 $\mu$m,
  $Zn_2SiO_4$ (zinc silicate): 0.5 $\mu$m, and
  α-quartz: 0.7 $\mu$m.
The organic vehicle used was a solution of ethyl cellulose in terpineol. The mixing proportion was 10 parts by weight of ethyl cellulose and 140 parts by weight of terpineol per 100 parts by weight of the nonmagnetic ceramic composition.

To measure the dielectric constant of the nonmagnetic ceramic composition after sintering, a multilayer ceramic capacitor was fabricated. First, only the nonmagnetic ceramic composition paste was stacked to a thickness of 200 $\mu$m by screen printing. Then, an internal electrode layer paste of the following composition and the nonmagnetic ceramic composition paste were alternately stacked by screen printing, followed by drying to form a green multilayer structure. The internal electrode layer paste contained 5 to 15 parts by weight of ethyl cellulose and 30 to 50 parts by weight of terpineol per 100 parts by weight of silver.

Next, the green multilayer structure was cut into green chips, which were fired in air for 2 hours, yielding capacitor chip bodies. The firing temperature is shown in Table 1. The nonmagnetic ceramic layer interleaved between the internal electrode layers had a thickness of 70 $\mu$m, the internal electrode layer had a thickness of 10 $\mu$m, and the capacitor chip body had planar dimensions of 4.5 mm×3.2 mm and a thickness of 0.81 mm in a stacking direction. Next, an external electrode paste was applied to outer surfaces of the capacitor chip body and baked at 620° C. for 10 minutes, yielding a multilayer ceramic capacitor. For the multilayer ceramic capacitors obtained in this way, the dielectric constant and insulation resistance of the nonmagnetic ceramic layer and the flexural strength of the body were determined. The results are shown in Table 1. With respect to sinterability, the sample was rated "○" when sintering caused a shrinkage factor of 15% or more and "×" when sintering caused a shrinkage factor of less than 15%.

For comparison purposes, similar tests were carried out using Ni—Cu—Zn ferrite (employed in conventional multilayer ceramic inductors) instead of the nonmagnetic ceramic composition. Also, all the samples were examined for chip deformation.

The chip deformation was rated in terms of a radius of curvature (R) of a corner of the deformed chip. More specifically, an external electrode was coated to an end of the chip to a thickness of 40 to 100 $\mu$m, and the length (size B) of the electrode which extends from the corner and covers the surface of the fired ceramic body was 300 $\mu$m. In this connection, it is prescribed that the range of radius of curvature of the corner within which an external electrode can be normally coated to the chip is 50 to 100 $\mu$m, and samples having a radius of curvature within this range are rated acceptable. If the radius of curvature is greater than this range, the external electrode deposits thickly and an extra portion outside the end region of the chip where the external electrode is coated is also rounded. If the radius of curvature is less than this range, the external electrode at the corner of the chip end becomes thin and less adhesive to the chip. Rating is made according to the following criterion.

○: 50 to 100 $\mu$m

Δ: from 40 $\mu$m to less than 50 $\mu$m, from more than 100 $\mu$m to 150 $\mu$m ×: less than 40 $\mu$m, more than 150 $\mu$m The results are also shown in Table 1.

TABLE 1

| Nonmagnetic ceramic composition No. | Composition (wt %) | | | Firing temp. (° C.) | Dielectric constant (ε) | Insulation resistance (Ω) | Flexural strength (Kgf/mm²) | Sinterability | Chip deformation |
| --- | --- | --- | --- | --- | --- | --- | --- | --- | --- |
| | Borosilicate glass | α-quartz | Filler zinc silicate | | | | | | |
| 1 comparison | 15* | 5 | 80* | 900 | 5.5 | 1 × 10¹⁰ | 9.6 | X | ○ |
| 2 comparison | 25* | 5 | 70* | 890 | 5.3 | 1 × 10¹¹ | 12.3 | X | ○ |
| 3 | 35 | 5 | 60 | 870 | 5 | 1 × 10¹³ | 14.4 | ○ | ○ |
| 4 comparison | 40 | 50* | 10 | 900 | 4.2 | 1 × 10¹⁰ | 5.3 | X | ○ |
| 5 | 50 | 40 | 10 | 860 | 4.2 | 1 × 10¹³ | 15.2 | ○ | ○ |
| 6 | 50 | 30 | 20 | 860 | 4.3 | 1 × 10¹³ | 14.7 | ○ | ○ |
| 7 | 50 | 20 | 30 | 860 | 4.5 | 1 × 10¹³ | 13.4 | ○ | ○ |
| 8 | 60 | 35 | 5 | 860 | 4.1 | 1 × 10¹³ | 16.8 | ○ | ○ |
| 9 | 60 | 30 | 10 | 860 | 4.2 | 1 × 10¹³ | 16.5 | ○ | ○ |
| 10 | 60 | 20 | 20 | 860 | 4.3 | 1 × 10¹³ | 15.7 | ○ | ○ |
| 11 | 60 | 10 | 30 | 860 | 4.5 | 1 × 10¹³ | 14.6 | ○ | ○ |
| 12 | 70 | 25 | 5 | 860 | 4.1 | 1 × 10¹³ | 16.2 | ○ | ○ |
| 13 | 70 | 20 | 10 | 860 | 4.2 | 1 × 10¹³ | 16.0 | ○ | ○ |
| 14 | 70 | 10 | 20 | 860 | 4.3 | 1 × 10¹³ | 15.2 | ○ | ○ |
| 15 | 70 | 5 | 25 | 860 | 4.4 | 1 × 10¹³ | 14.0 | ○ | ○ |

TABLE 1-continued

| Nonmagnetic ceramic composition No. | Composition (wt %) | | | Firing temp. (° C.) | Dielectric constant (ε) | Insulation resistance (Ω) | Flexural strength (Kgf/mm²) | Sinter-ability | Chip deformation |
|---|---|---|---|---|---|---|---|---|---|
| | Boro-silicate glass | α-quartz | Filler zinc silicate | | | | | | |
| 16 comparison | 80* | 10 | 10 | 860 | 4.2 | 1 × 10¹³ | 8.5 | ○ | Δ |
| 17 comparison | 90* | 5 | 5 | 850 | 4.1 | 1 × 10¹³ | 7.2 | ○ | X |
| 18 comparison | Ni—Cu—Zn ferrite | | | 870 | 13 | 1 × 10¹⁴ | 13 | ○ | ○ |
| 19 comparison | forsterite | | | 870 | 6.5 | 1 × 10¹³ | 13.2 | ○ | ○ |
| 20 comparison | $B_2O_3$—$SiO_2$—CaO—BaO | | | 980 | 6.4 | 1 × 10¹³ | 15.2 | ○ | ○ |

*outside the scope of the invention

As shown in Table 1, the nonmagnetic ceramic layers using the nonmagnetic ceramic compositions within the scope of the invention have significantly lower dielectric constants than the Ni—Cu—Zn ferrite. Like the Ni—Cu—Zn ferrite, the nonmagnetic ceramic layers can be fired simultaneous with the silver electrode. In the samples using the nonmagnetic ceramic compositions within the scope of the invention, neither chip deformation nor cracking was found.

Figure 7:
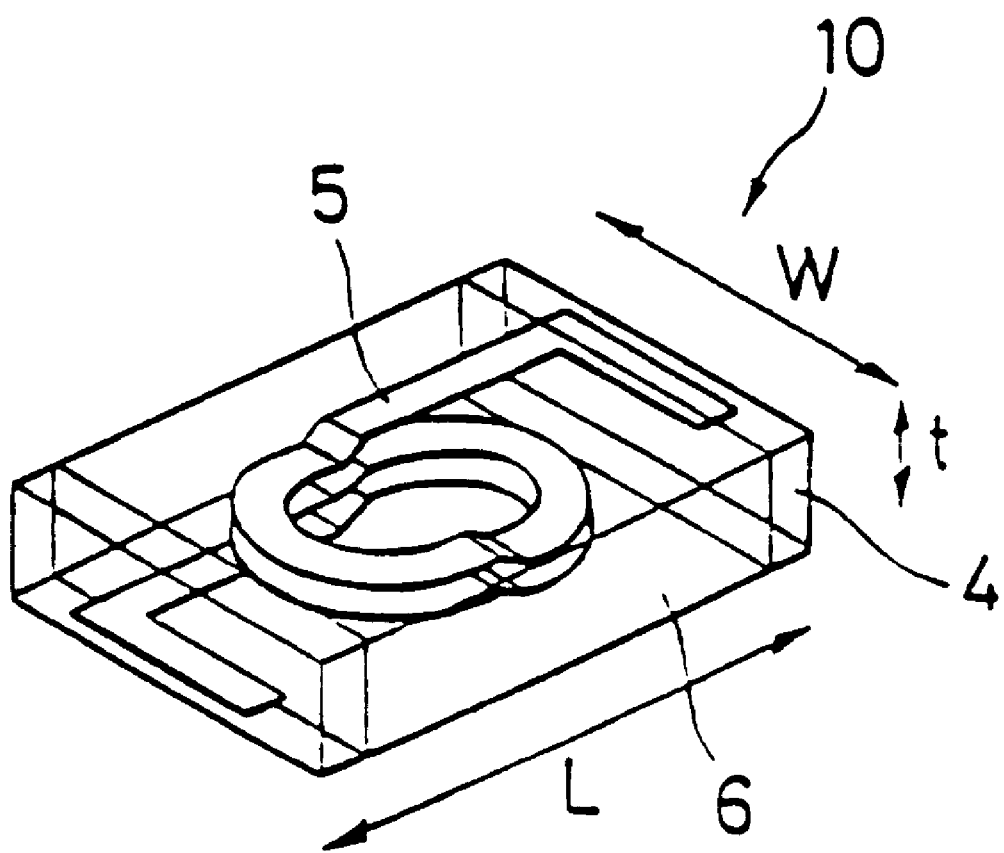
FIG. 7 is a schematic view showing the structure of a multilayer ceramic inductor chip according to one embodiment of the invention.

Next, an inductor having nonmagnetic ceramic layers of the composition designated sample No. 9 in Table 1 was fabricated by the printing technique shown in FIG. 3 and fired in air for 2 hours, yielding an inductor chip 10 as shown in FIG. 7 where the winding is depicted with partial omission. The internal conductor 5 in this inductor chip 10 had a number of turns of 10.5 and a winding pitch of 40 μm, and the inductor chip 10 was dimensioned L=1.6 mm, N=0.8 mm, and t=0.8 mm. Also, in a comparative example, an inductor chip of the same shape as above was fabricated using 40% by weight of a forsterite material 2MgO—$SiO_2$ as the filler. This material had a dielectric constant of 6.5. No cracking occurred in this case too.

Figure 9:
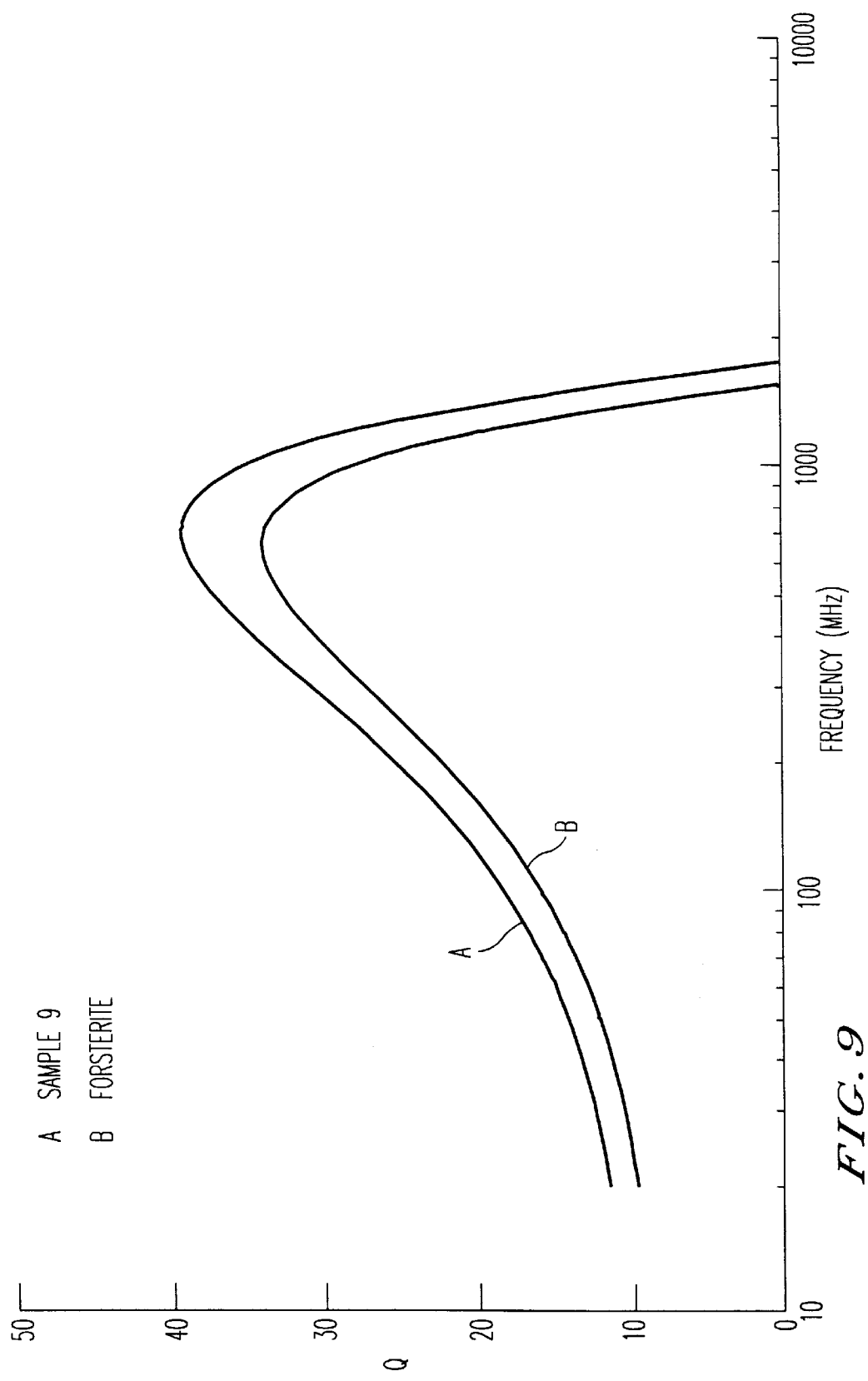
FIG. 9 is a graph showing the frequency response of Q of multilayer ceramic inductors.
Figure 10:
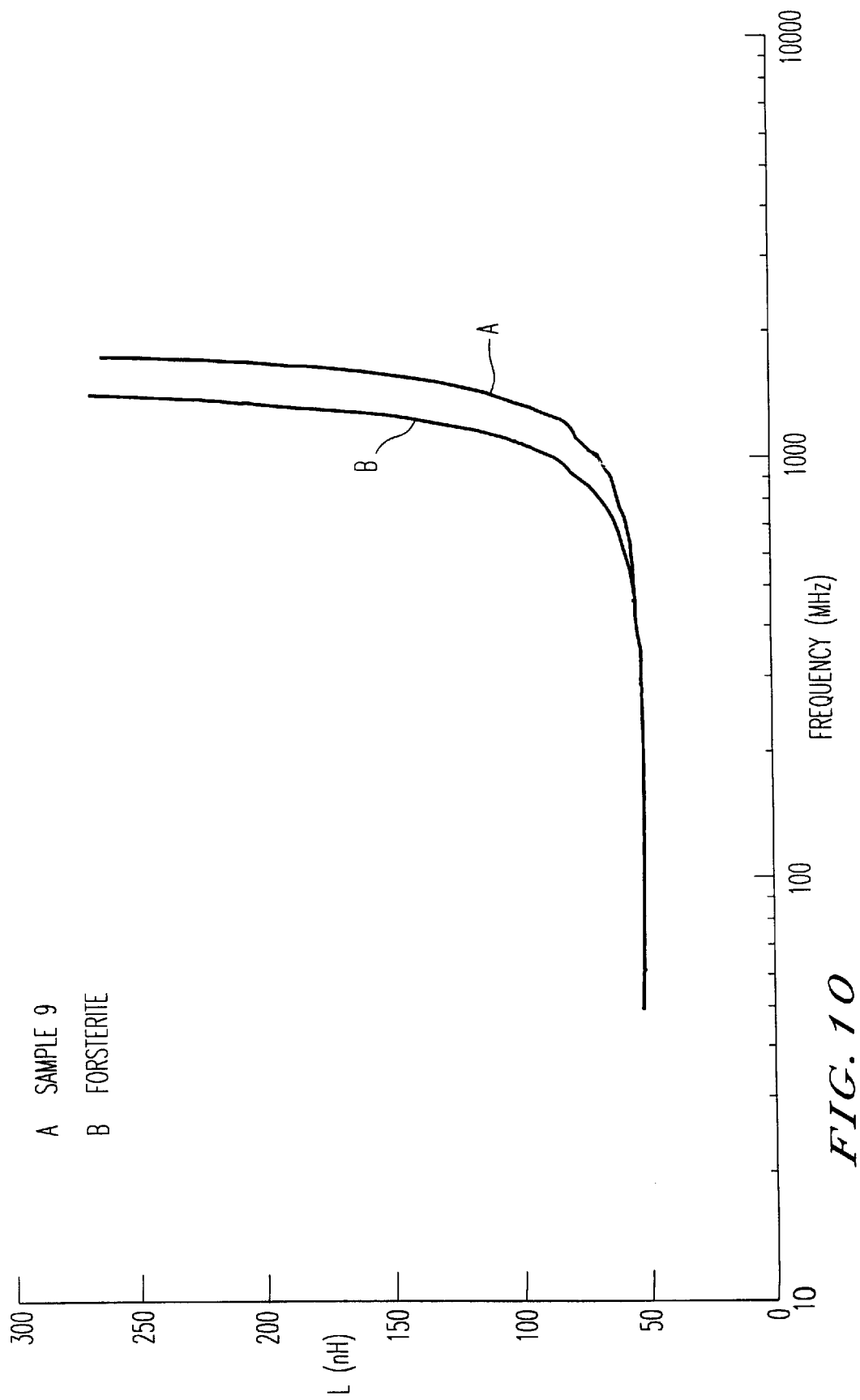
FIG. 10 is a graph showing the frequency response of L of multilayer ceramic inductors.

Using HP4291A and Fixture 16193A, these inductor chips were measured for the frequency responses of Q and L in the frequency range of 50 MHz to 1.8 GHz. FIGS. 9 and 10 are graphs showing the frequency dependency of Q and L, respectively. As shown in FIG. 9, the inductor chip to which the nonmagnetic ceramic of the invention is applied shows higher values of Q than the forsterite material. Also as seen from FIG. 7, the inductor chip to which the non-magnetic ceramic of the invention is applied shows a superior high-frequency response of L to the forsterite material and is applicable to further high frequencies of at least 1.5 GHz.

Further, a chip inductor was fabricated as in sample No. 9, but replacing the borosilicate glass by a material of 10$B_2O_3$-45$SiO_2$-10CaO-10BaO in mol % (5.37% $B_2O_3$, 24.68% $SiO_2$, 5.12% CaO and 13.99% BaO in % by weight) approximate to JP-A 265858/1988. In this case, the dielectric constant was 6.4, the firing condition was as high as 980° C., which prohibited the use of silver (100%) conductive material as the internal conductor. When Ag/Pd was used, the high-frequency response showed a low value of Q and a self-resonant frequency approximate to the forsterite.

Although the printing technique was used in the foregoing Examples, it was confirmed that equivalent results were obtained when the sheeting technique was used. The borosilicate glass showed equivalent results over the $SiO_2$ content range from 70% to 90% by weight. Equivalent results were obtained when $K_2O$ was excluded from the borosilicate glass or when the borosilicate glass contained up to 5% by weight of at least one of $Na_2O$, BaO, SrO and CaO instead of or in addition to $K_2O$.

The benefits of the invention are evident from the results of the foregoing Examples.

We claim:

1. A nonmagnetic ceramic comprising 35% to 75% by weight of borosilicate glass as a matrix and 5% to 40% by weight of α-quartz and 5% to 60% by weight of zinc silicate dispersed therein, said borosilicate glass having contents of $SiO_2$ and $B_2O_3$:
$SiO_2$=70 to 90% by weight and
$B_2O_3$=10 to 30% by weight.

2. The nonmagnetic ceramic of claim 1 which has been prepared by mixing the borosilicate glass with α-quartz and zinc silicate, followed by firing.

3. The nonmagnetic ceramic of claim 1 wherein said borosilicate glass contains as an auxiliary component at least one member selected from the group consisting of $K_2O$, $Na_2O$, BaO, SrO, $Al_2O_3$, and CaO in a total amount of up to 5% by weight.

4. The nonmagnetic ceramic of claim 1 wherein said α-quartz has a mean particle size of 0.1 to 5.0 μm.

5. The nonmagnetic ceramic of claim 1 having a dielectric constant of 4.0 to 5.4.

* * * * *